United States Patent [19]
Branson et al.

[11] Patent Number: 4,964,739
[45] Date of Patent: Oct. 23, 1990

[54] FLEXIBLE CONTAINER HAVING TAMPER EVIDENT CLOSURE

[75] Inventors: Mark E. Branson, Shelbyville; Paul F. Edelman, Greenwood, both of Ind.

[73] Assignee: KCL Corp., Shelbyvile, Ind.

[21] Appl. No.: 334,697

[22] Filed: Apr. 6, 1989

[51] Int. Cl.$^5$ .............................................. B65D 33/34
[52] U.S. Cl. ............................................ 383/5; 383/63
[58] Field of Search .................. 383/5, 63, 65; 24/587

[56] References Cited

U.S. PATENT DOCUMENTS

| | | | |
|---|---|---|---|
| 3,808,649 | 5/1974 | Augnit | 387/63 |
| 4,354,541 | 10/1982 | Tilmen | 383/63 |
| 4,744,674 | 5/1988 | Nocek | 383/63 |
| 4,791,710 | 12/1988 | Nocek et al. | 24/587 |
| 4,832,505 | 5/1989 | Ausnit et al. | 383/65 |
| 4,848,928 | 7/1989 | Ausnit | 383/63 |

Primary Examiner—Stephen P. Garbe

[57] ABSTRACT

A tamper evident bag having a non-reusable frangible fastener profile assembly comprising two sets of lockable fastener profile elements specially constructed to manually lock together without the use of tools, and which once locked cannot be forcibly pulled apart. The bag includes a frangible connector bridge which will break away when the bag is opened indicating that the bag has been tampered with. The construction of the fastener elements also assures proper alignment of the lockable fastener profile elements across the length of the upper portion of the bag wall panels, making interlocking closure easy when pressure is applied on the outer walls of the bag behind the fastener profile elements.

17 Claims, 3 Drawing Sheets

FLEXIBLE CONTAINER HAVING TAMPER EVIDENT CLOSURE

BACKGROUND OF THE INVENTION

This invention relates generally to tamper evident bags of the type typically fabricated from plastic film and having two opposing bag walls.

Various methods have attained widespread use for sealing bags after they have been loaded with contents. These methods include interlocking fasteners of a non-permanent type which are readily closed and opened by simple manual manipulation, and interlocking fasteners or other closable arrangements which are of a permanent type. These methods carry with them several disadvantages which the present invention solves. Interlocking fasteners of the non-permanent type have the problem of opening unintentionally. This is usually caused by the load of contents exerting force against the side walls of the bag thereby forcing the closure apart. Unintentional opening can also occur in the normal course of handling after the bag has been filled. A further problem with this type of closure is the lack of security associated therewith due to the easy opening nature of the closure. Therefore use of the bags with such a closure is limited to those areas where a secured closure is unnecessary such as in a consumer household setting.

Bags with interlocking closures of the permanent type, currently known in the art, require the use of a tool, either attached to the bag or independent therefrom, in order to open and/or seal the bag. Representative of this is U.S. Pat. No. 3,808,649. Use of such a tool is very inconvenient and awkward to the user and also requires an additional expense, neither of which is necessary with a closure which can be manually opened and closed.

Another type of closure arrangement known in the art is a heat seal which permanently seals the contents into a bag after the bag has been loaded. This method has the disadvantage of requiring heat seal equipment which can be expensive and requires continuous maintenance. Such a method is normally used where the bags are filled prior to shipping. In instances which require shipping empty bags to the ultimate user so that they may fill the bags, such expense associated with heat seal equipment can be prohibitive and the method of closure completely inconvenient and inappropriate for such use.

SUMMARY OF THE INVENTION

It is an object of the present invention to provide a tamper evident bag having an interlocking fastener device which can be closed without the use of tools or other equipment, and which will not disengage during handling or when being pulled or pried apart.

It is a further object of the invention to provide a bag having a tamper evident interlocking fastener device which, when opened, will indicate the bag has been tampered with.

It is a further object of the invention to attain such a desirable fastener construction in an economical and highly efficient manner.

One embodiment of the present invention includes a tamper evident bag having two opposing wall panels and a non-reusable frangible fastener profile assembly extending across the upper portion of said wall panels, said fastener assembly comprising first and second lockable fastener profile elements. These elements become interconnected by manually pressing the sets of lockable fastener profile elements together. This action permanently seals the bag in that once the interconnection is achieved, the lockable fastener profile elements cannot be disengaged. Opening of the bag can be achieved, however, by pulling the upper portion of the wall panels apart with sufficient force to break a frangible connector bridge associated with either of the lockable fastener profile elements whereby the broken frangible connector bridge indicates that the bag has been tampered with and cannot be reclosed.

BRIEF DESCRIPTION OF THE DRAWINGS

Other objects, features and advantages of the present invention will be readily apparent from the following description of a representative embodiment thereof, taken in conjunction with the accompanying drawings, although variations and modifications may be effected without departing from the spirit and scope of the novel concepts embodied in the disclosure and in which.

DESCRIPTION OF THE PREFERRED EMBODIMENT

Figure 2:
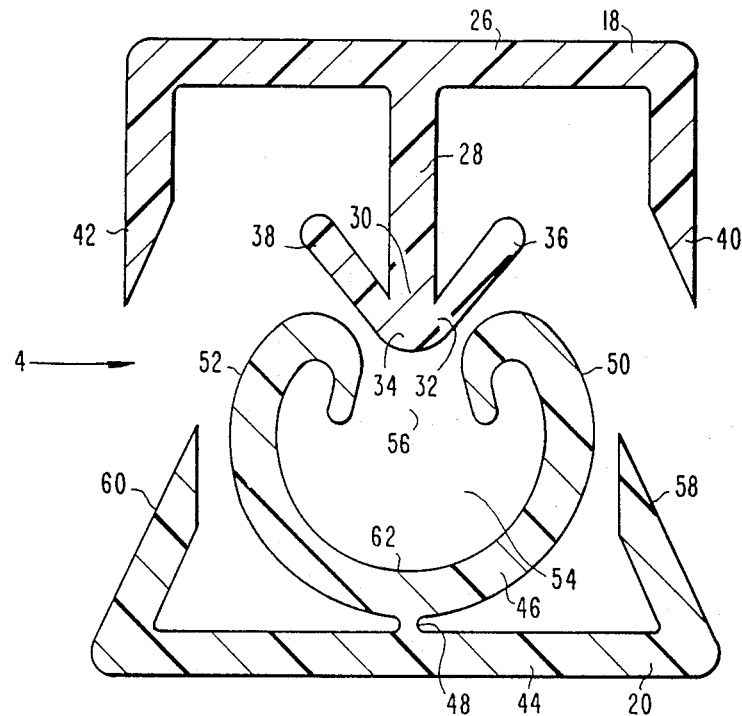
FIG. 2 is a fragmentary sectional view showing the lockable fastener profile elements of FIG. 1 prior to interconnection.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
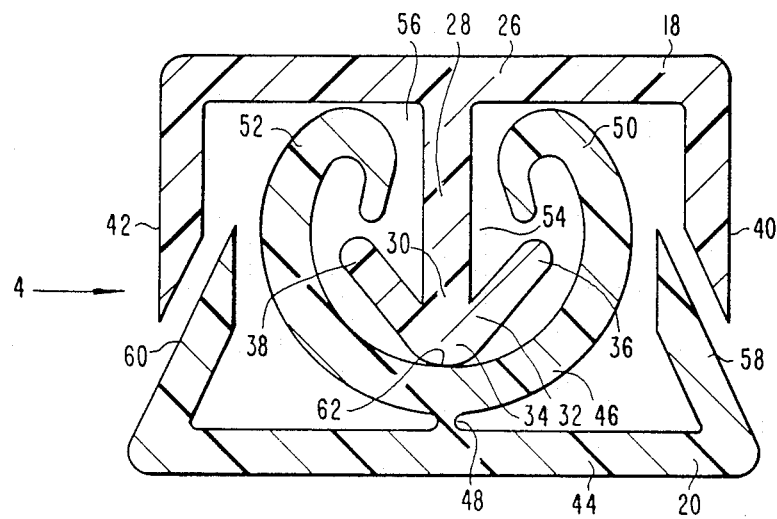
FIG. 1 is a fragmentary sectional view of lockable fastener profile elements embodying the present invention.

A tamper evident bag 2 is provided comprising a non-reusable frangible fastener profile assembly 4, which is illustrated in FIG. 1. Bag 2 is constructed of a suitable plastic film. The bag 2 has opposing wall panels 6 and 8 with the inside surfaces 10 and 12 facing toward each other, and a non-reusable frangible fastener profile assembly 4 adapted to be attached to said inside surfaces of the top portion 14 and 16 of said wall panels 6 and 8 respectively. Said non-reusable frangible fastener profile assembly 4 comprises first 18 and second 20 cooperating flexible extruded plastic lockable fastener profile elements which are attached to the inside surfaces 10 and 12 of the wall panels 6 and 8. The attachment of the lockable fastener profile elements 18 and 20 to the inside surfaces 10 and 12 of the wall panels 6 and 8 is accomplished by fusing them together at 22 and 24. In the alternative, they can be extruded integral with the wall panels 6 and 8. The connections 22 and 24 are made at the upper portion 14 and 16 of the inside surface 10 and 12 of the wall panel 6 and 8, respectfully.

The first lockable fastener profile element 18 includes a web portion 26 and formed on this web portion 26 is a rib element 28 which projects outwardly therefrom. This rib element 28 has a neck portion 30 at the end of which is an arrow shaped head 32. The head 32 has a tip 34, and on each side of the tip 34 and projecting outwardly therefrom are side barbs 36 and 38. The web portion 26 further has profile guide elements 40 and 42 located at each end of the web portion 26 and extending outwardly therefrom. Other configurations of fastener profiles commonly known in the art and which are manually lockable may also be used.

The second lockable fastener profile element 20 also has a web portion 44 and formed on this web portion 44 is a groove element 46. This groove element 46 is connected to the web portion 44 by a frangible connector bridge 48 which is formed therebetween. The groove element 46 has a set of jaws 50 and 52 which project outwardly to form a groove receptacle 54 which is shaped to receive the head portion 32 of the rib element 28 of the first set of lockable fastener profile elements 18. The jaws 50 and 52 are shaped such that there is an entrance slot 56 therebetween into which the head portion 32 of the rib element 28 is directed during closure. The web portion 44 further includes profile guide elements 58 and 60 which are located at each end of the web portion 44 and which project perpendicularly thereto.

The first 18 and second 20 lockable fastener profile elements are attached to the upper portions 14 and 16 of the wall panels 6 and 8 so as to project from the wall panels 6 and 8 and toward each other. They are arranged such that each lockable fastener profile element 18 and 20 is aligned to insure proper alignment for closure when the lockable fastener profile elements 18 and 20 are pressed together.

When sealing the bag 2, the lockable fastener profile elements 18 and 20 are manually pressed together, without the use of any tools or other devices. The disclosed construction of the lockable fastener profile elements 18 and 20 with the arrow head and groove element along with the profile guide elements 40, 42, 58 and 60 insures proper alignment so that closure is made easy. Therefore, this construction avoids the problem of misalignment during closing. The fact that misalignment is avoided and that tools are unnecessary, make closure of the bag very swift and efficient.

Figure 3:
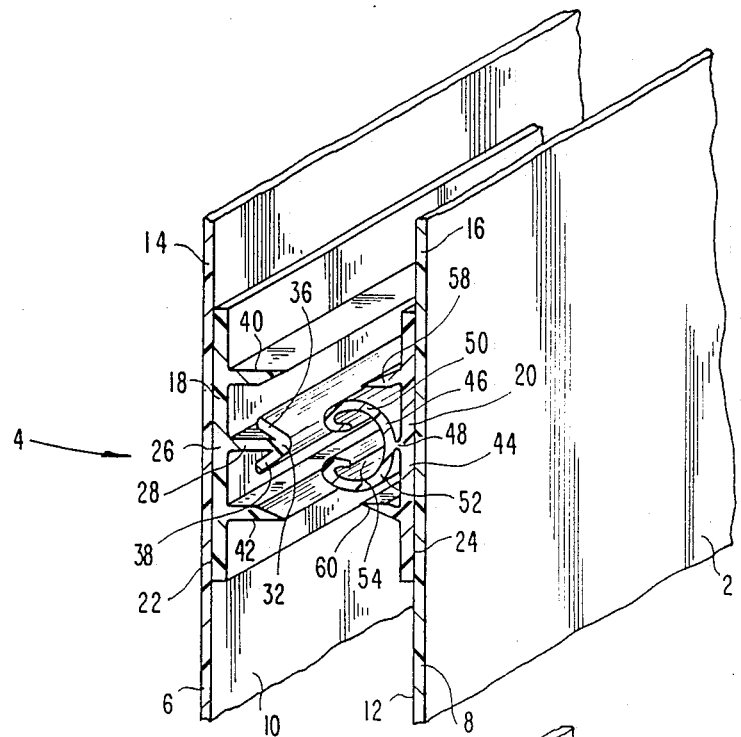
FIG. 3 is a fragmentary sectional perspective view of a bag having a tamper evident fastener profile assembly embodying the present invention and illustrating lockable fastener profile elements arranged prior to interlocking.
Figure 4:
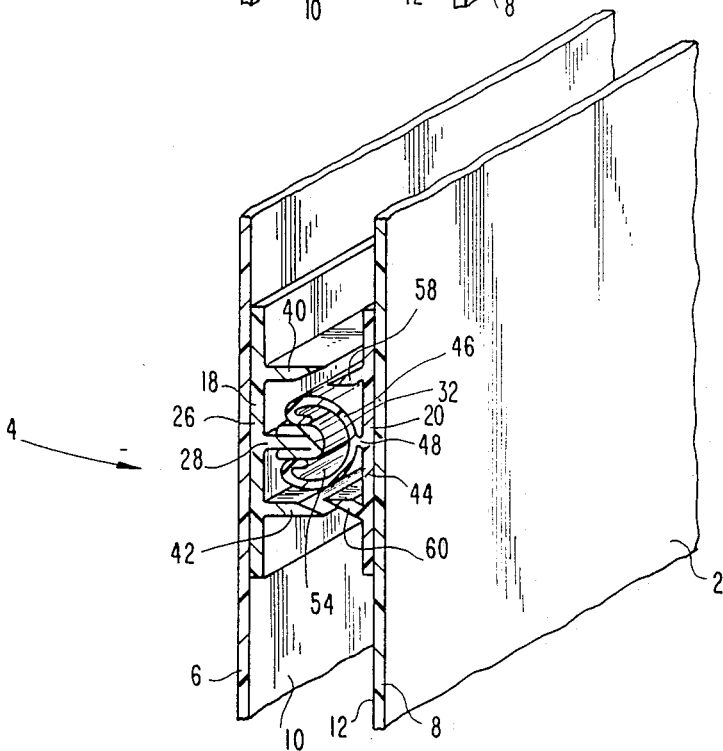
FIG. 4 is a fragmentary sectional perspective view illustrating the lockable fastener profile elements of FIG. 3 moving into the interlocking position.

As the rib element 28 is pressed into the entrance slot 56 between the jaws 50 and 52 which form a groove receptacle 54, as illustrated in FIGS. 2 and 3, the jaws 50 and 52 of the groove element 46 bend outward and around the head 32 of the rib element 28 as shown in FIG. 4. At the same time, the side barbs 36 and 38 which extend outward from the tip 34 of the head portion 32 of the rib element 28, bend inwardly toward the neck 30 of the rib element 28. The groove receptacle 54 which is formed by the jaws 50 and 52 is shaped to be complementary to the arrow-shaped head portion 32 of the rib element 34. When the head portion 32 is pressed completely into the groove receptacle 54 such that the tip 34 of the head portion 32 is touching the bottom 62 of the groove element 46, the side barbs 36 and 38 snap back to their original position extending outwardly from the head 32, and the jaws 50 and 52 simultaneously snap around the bags 36 and 38 permanently locking the head portion 32 into the groove receptacle 54.

Figure 5:
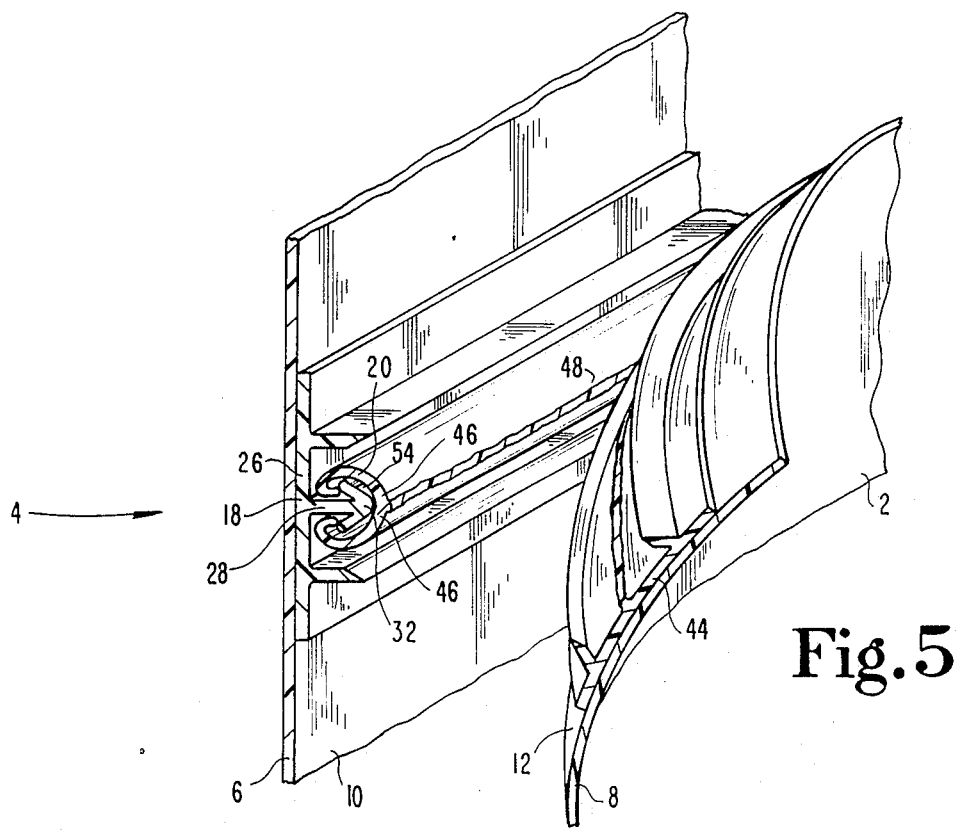
FIG. 5 is a fragmentary sectional perspective view illustrating the tamper evident fastener profile assembly during opening.

The interconnection formed by the rib head 32 and groove element 46 arrangement is a permanent seal which cannot be disengaged. Therefore as illustrated in FIG. 5, opening of the bag 2 is accomplished by pulling the wall panels 6 and 8 apart above the non-reusable frangible fastener profile assembly 4 with sufficient force to break the frangible connector bridge 48 which is formed between the groove element 46 and web portion 44 of the second set of lockable fastener profile elements 20. The interconnected non-reusable frangible fastener profile assembly 4 remains intact after opening. The broken frangible connector bridge 48 serves to indicate that the bag 2 has been tampered with.

It will thus be apparent that the present invention provides an advantageous, especially convenient, economical and efficient tamper evident fastener arrangement 4 which provides a unique combination of features which have not previously been available in this desirable combination. This fastener arrangement 4 provides for assured alignment of the lockable fastener profile elements 18 and 20 during closing maneuvers without the requirement of tools to seal the bag 2, and includes a novel frangible connector bridge 48 which will break away when the bag 2 is opened indicating that the fastener profile assembly has been tampered with.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A tamper evident bag comprising two opposing wall panels and a tamper evident frangible fastener profile assembly attached to the inside surface of said walls proximate to the top portion thereof, said tamper evident frangible fastener profile assembly comprising:

a first lockable fastener profile element being formed of plastic and having a web portion with a rib extending lengthwise therealong, said rib comprising a neck portion formed on said web and with a head thereon with a tip at the distal end of said head and at least one side barb projecting outwardly from the side of said head;

a second lockable fastener profile element being formed of plastic and having a web portion having a groove element extending lengthwise therealong, said groove element comprising a pair of jaws spaced to form a groove receptacle to receive said head therebetween and with an entrance opening leading into said groove receptacle and the groove receptacle shaped to correspond to the shape of said head, whereby said head is received by said groove receptacle thereby forming a locked interconnection, said locked interconnection being permanent; and a bridge portion connecting said groove element to the web of said second lockable fastener profile element, said bridge being frangible whereby said bridge will snap or break when the groove element and web portion of said second element are pulled apart, whereby opening of said bag is effective to sever said bridge thereby visually indicating the opened condition of said bag.

2. A tamper evident bag comprising two opposing wall panels and a tamper evident frangible fastener profile assembly attached to the inside surface of said walls proximate to the top portion thereof, said tamper evident frangible fastener profile assembly comprising:

first and second cooperating lockable fastener profile elements arranged in a position facing each other;

said first and second lockable fastener profile elements being cooperatively arranged for alignment thereby facilitating interlocking closure engagement of the frangible fastener profile assembly by manually applying pressure from the outside of said wall panels in an inward direction behind said lockable fastener profile elements;

said first lockable fastener profile element being formed of a plastic material and comprising a web portion and a rib element, said second lockable fastener profile element being formed of a plastic material and comprising a web portion connected to a groove element by a frangible connector bridge, said rib element being adapted for reception by said groove element, whereby a locked interconnection is formed; and said frangible connector bridge being adapted for severance when said top of said bag walls are separated, thereby permanently visually indicating the open condition of said bag.

3. The tamper evident bag of claim 2 wherein each of said profile elements includes a pair of parallel profile guide elements sized and positioned for guiding said profile elements into alignment.

4. The tamper evident bag of claim 2, wherein each of said first and second profile elements includes a guide element, a first one of said guide elements including a pair of parallel walls defining a channel, and a second one of said guide elements including a pair of angled walls adapted to enter said channel and align said profile elements when pressure is applied to said wall panels.

5. A non-reusable frangible fastener profile assembly adapted for use with a bag including opposite wall panels with inside surfaces facing toward each other, said fastener profile assembly comprising:

a first lockable fastener profile element;

a second lockable fastener profile element;

said first lockable fastener profile element including a first portion which is connectible to said second profile element and including a second web portion which is attachable to one of the wall panels of said bag;

said second lockable fastener profile element including a first portion which is adapted to be interconnected in a permanently locked arrangement with the first portion of said first element, said second profile element also including a second web portion which is attachable to the other of the wall panels of said bag; and a frangible bridge connecting the first portion of said second profile element to the web portion of said second profile element whereby force separating said first and second portions of said second profile element breaks said bridge.

6. The non-reusable frangible fastener profile assembly according to claim 5 additionally comprising a rib element and a groove element which are manually interlockable and are each part of said respective first and second profile elements.

7. The non-reusable frangible fastener profile assembly according to claim 5 wherein said frangible connector bridge is weaker in strength than the interconnection formed between said first and second profile elements when said elements are in interlocking engagement.

8. A permanently sealable bag comprising:

opposite wall panels with inside surfaces facing toward each other, each of said wall panels having an upper portion;

first and second cooperating lockable fastener profile elements arranged in a position facing each other, said first lockable fastener profile element being secured to one of said inside surfaces of said wall panels projecting toward the other of said inside wall panels, and said second lockable fastener profile element being secured to the other of said inside surfaces of said wall panels projecting toward said first lockable fastener profile element, each of said first and second lockable fastener profile elements being aligned with respect to each other for closure, and extending the length of said upper portion of each of said wall panels;

said first lockable fastener profile element comprising a first web portion attached to said one of said inside surfaces of said wall panels at said upper portion and extending lengthwise therealong, said first web portion comprising first profile guide elements at the top and bottom of said first web portion and projecting outwardly from said first web portion and extending lengthwise therealong, said first profile element further comprising a neck portion and a head portion, said head portion having a tip and at least one side barb extending outward from said tip;

said second lockable fastener profile element comprising a second web portion attached to the inside of the other of said wall panels at said upper portion and extending lengthwise therealong, said second web portion comprising second profile guide elements at the top and bottom of said second web portion and projecting outwardly from said second web portion and extending lengthwise therealong, said second profile element further comprising a groove element, said groove element being attached to said second web portion by a frangible connector bridge, said groove element comprising two jaws which form a groove receptacle and into which groove receptacle said head portion of said first profile element is received;

said profile guide elements of said first and second lockable fastener profile elements projecting toward each other and properly arranged for insuring proper alignment of said first and second lockable fastener profile elements when pressure is applied during closure;

said jaws of said groove element being enclosed around said at least one barb of said head portion of said profile element when said head portion is pressed into said groove receptacle for interlocking; and said frangible connector bridge breaking away from said web portion of said second lockable fastener profile element when force is applied against said groove receptacle and head portion when the groove receptacle and head portion are in interlocking engagement.

9. The bag according to claim 8 wherein said frangible connector bridge is adapted to break when force is applied against said groove receptacle and head portion, when the receptacle and head portion are in interlocking engagement, while said engagement remains intact.

10. The bag according to claim 8 wherein said jaws open sufficiently to receive said head when said head is pressed into said groove receptacle.

11. The bag according to claim 8 wherein said jaws bend around and enclose said at least one barb which extends outwardly from said head portion.

12. The bag according to claim 8 wherein said at least one barb of said head portion bends upwardly against said neck portion and said jaws of said groove element bend around said at least one barb when the profile elements are pressed together.

13. The bag according to claim 8 wherein said profile guide elements of said first and second lockable fastener profile elements insure proper alignment of said fastener elements.

14. The bag according to claim 8 wherein said groove receptacle is shaped to receive and permanently retain said head portion.

15. The bag according to claim 8 wherein said lockable fastener profile elements are fused to said inside surfaces at said upper portion of said wall panels.

16. The bag according to claim 8 wherein said lockable fastener profile elements are integral with said wall panels.

17. The bag of claim 8 wherein said bridge has a tensile strength of approximately 4 lbs.

* * * * *

UNITED STATES PATENT AND TRADEMARK OFFICE
CERTIFICATE OF CORRECTION

PATENT NO. : 4,964,739

DATED : October 23, 1990

INVENTOR(S) : Mark E. Branson

It is certified that error appears in the above-identified patent and that said Letters Patent is hereby corrected as shown below:

In block 75 of the title page, Paul F. Edelman's address of "Greenwood" should read --Indianapolis--.

In block 73 of the title page, the assignee's address should be changed from "Shelbyvile" to --Shelbyville--.

Before item (57) of the title page, Attorney, Agent or firm has been omitted and should be included to read --Woodard, Emhardt, Naughton, Moriarty & McNett--.

Signed and Sealed this

Twenty-eighth Day of April, 1992

Attest:

HARRY F. MANBECK, JR.

Attesting Officer      Commissioner of Patents and Trademarks